March 14, 1950          A. C. KORTE          2,500,834
FUEL PUMP MOUNTING

Filed Nov. 13, 1945          3 Sheets-Sheet 1

*INVENTOR.*
ALFRED C. KORTE
BY
*George R. Ericson*
ATTORNEY

March 14, 1950 — A. C. KORTE — 2,500,834
FUEL PUMP MOUNTING

Filed Nov. 13, 1945 — 3 Sheets-Sheet 2

*INVENTOR.*
ALFRED C. KORTE
BY
George R. Ericson
ATTORNEY

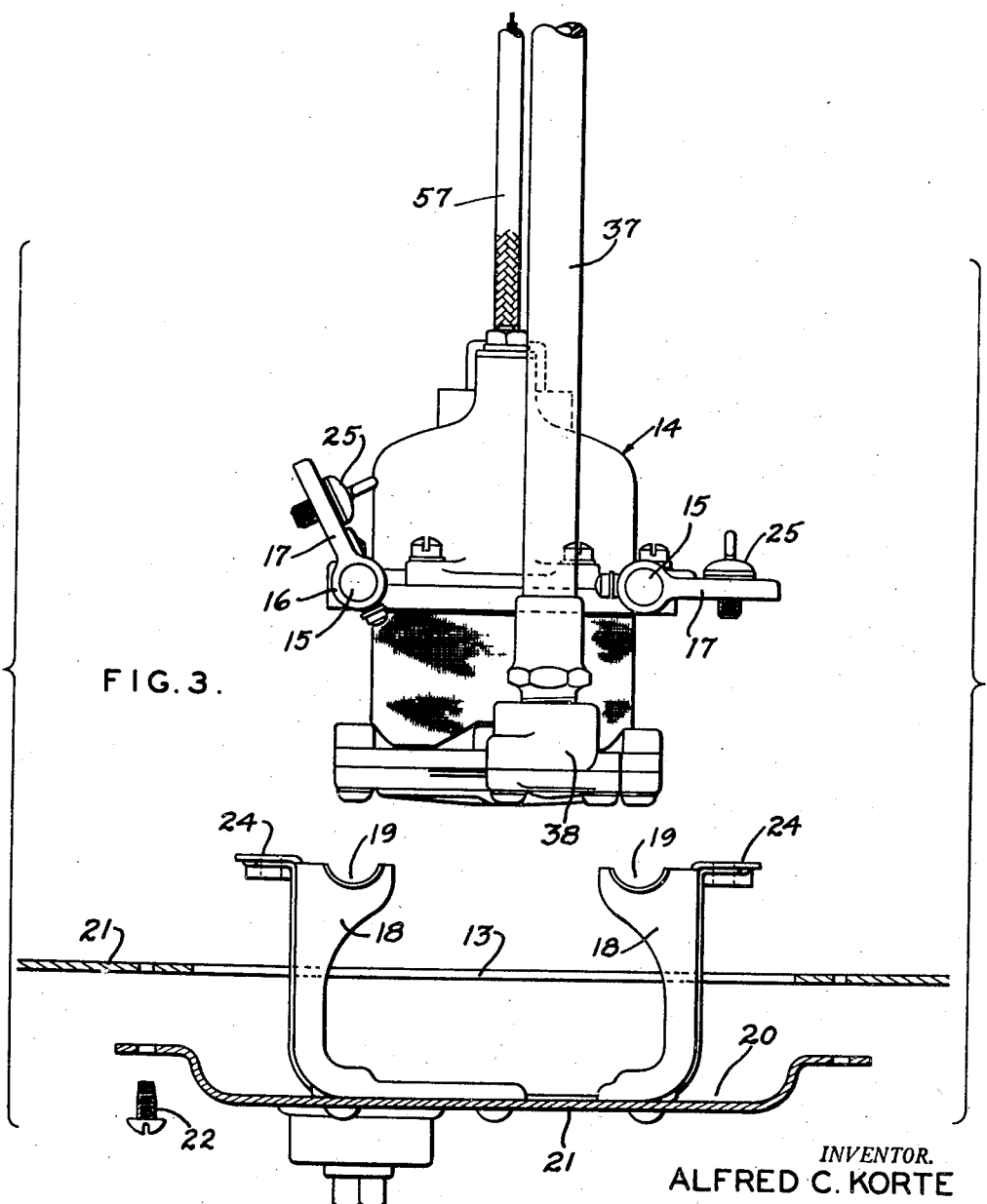

Patented Mar. 14, 1950

2,500,834

UNITED STATES PATENT OFFICE 2,500,834

FUEL PUMP MOUNTING

Alfred C. Korte, St. Louis, Mo., assignor to Carter Carburetor Corporation, St. Louis, Mo., a corporation of Delaware Application November 13, 1945, Serial No. 628,286

2 Claims. (Cl. 158—36.3)

This invention relates to fuel tanks and consists particularly in novel means for mounting a fuel pump or other accessory within the tank while providing for sealed connections through the tank wall and for ready access to the pump or accessory for inspection or repair purposes.

A co-pending application of the present inventor, Serial No. 473,683, filed January 27, 1943, now Patent No. 2,394,860, illustrates a novel form of electric fuel pump which operates normally submerged in the fuel tank of an automotive vehicle. Where the fuel tank is not originally constructed for receiving this pump, it is necessary to cut holes in the tank wall through which the pump may be inserted and also to provide considerable supporting structure for the pump itself. Moreover, a portion of the tank wall should be constructed to facilitate inspection and repair of the pump and its motor from time to time.

It is an object of the present invention, to provide tank wall structure which will accommodate such a fuel pump or other accessory.

Another object is to provide tank wall structure with an opening for insertion of the pump and with a readily detachable closure to facilitate inspection and repair of the pump.

Another object is to provide tank wall structure having an opening for insertion of the pump and a readily detachable closure which mounts the various pump connections.

Still another object is to provide wall structure for closing the opening provided in a fuel tank wall for receiving such an accessory, said wall structure including sealing means for the accessory.

These objects and other more detailed objects hereafter appearing are attained by the structure illustrated in the accompanying drawing in which Fig. 1 is a sectional view of a fuel tank structure embodying the invention, a fuel pump being represented in elevation.

Fig. 3 is a view showing the lower part of the tank structure, with the fuel pump disassembled.

Figure 1:
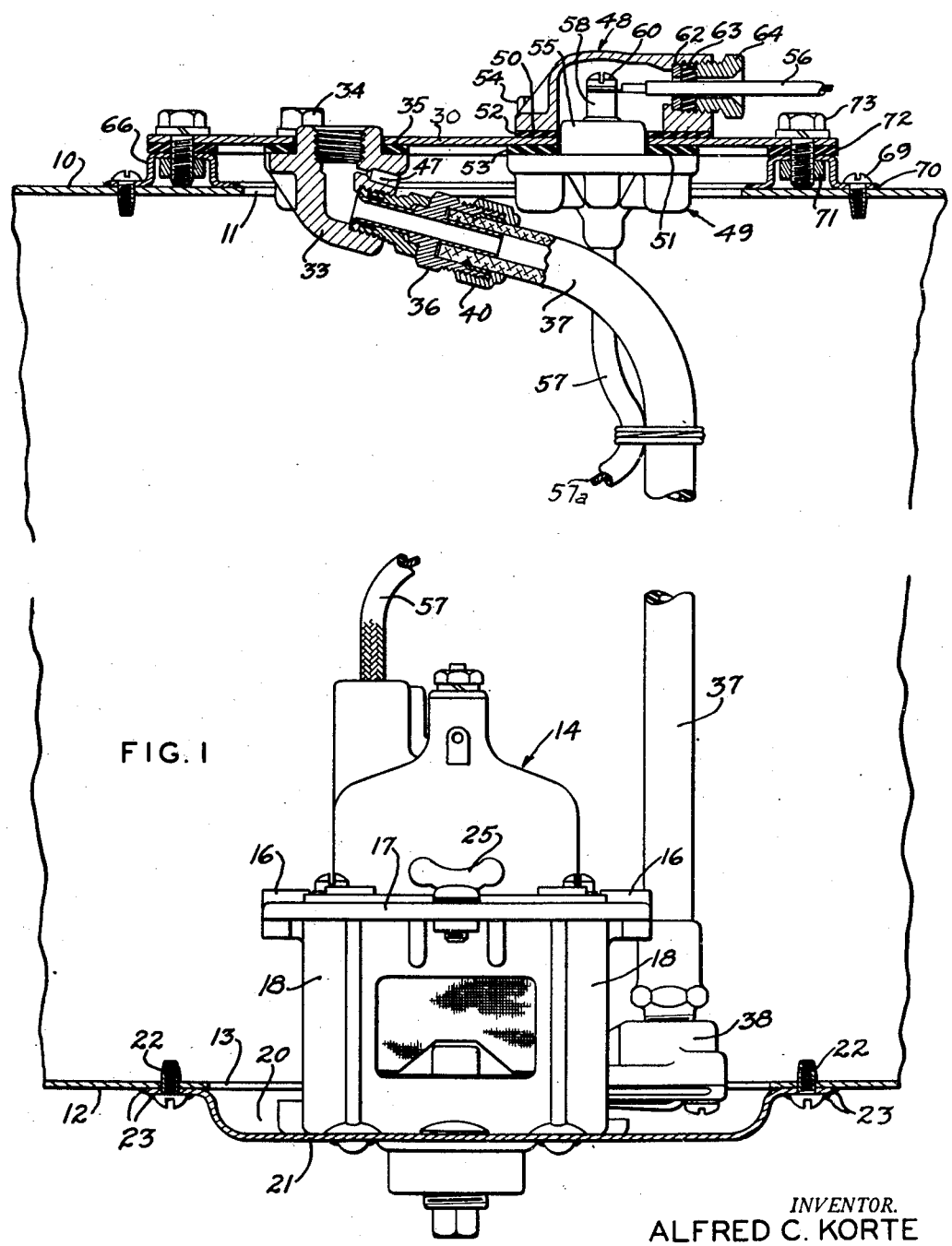
Figure 2:
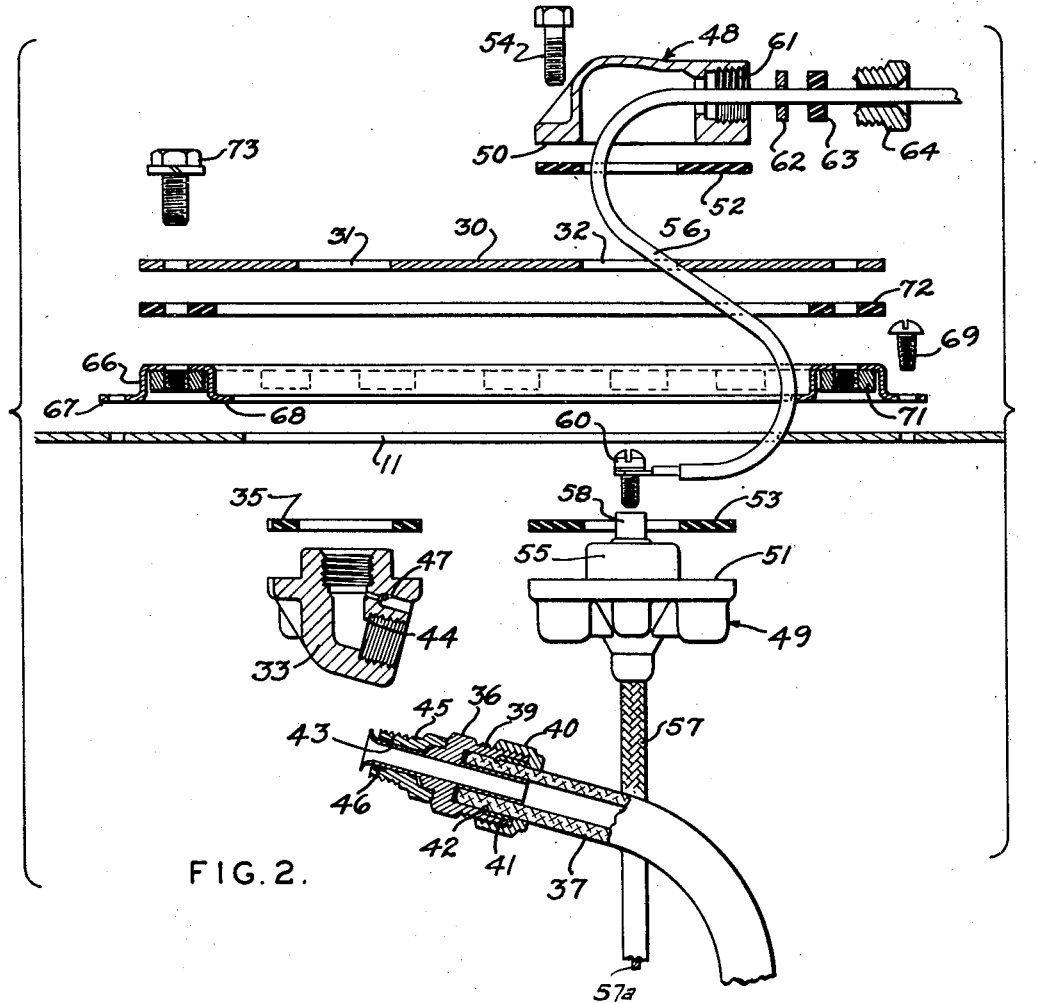
Fig. 2 is a disassembled view showing the upper parts of the tank structure.

Fig. 1 shows a portion of a fuel tank for an automotive vehicle, for instance, having a top wall 10 with an opening 11 and a bottom wall 12 with an opening 13. Opening 11 provides for admission into the interior of the tank of an electrical fuel pump, generally indicated at 14 which may be of the type described and claimed in the above mentioned co-pending application. The pump body is provided with projecting trunnions 15, conveniently of synthetic rubber, which rotatably mount apertured bosses or eyes 16 at the ends of handle brackets 17. These brackets are both turned upwardly, as in the case of the left hand bracket 17 in Fig. 3, to facilitate grasping the pump and inserting the same through opening 11. A pair of cradle members 18 have semi-circular recesses 19 for receiving the eye portions of handle brackets 17 so as to stably position the pump. Cradles 18 are riveted to the central depressed portion 20 of a separate plate 21 attached to tank bottom wall 12 by machine screws 22. Plate 21 is then soldered around its edges, as at 23, so that bottom opening 13 is permanently sealed to prevent leakage.

After the pump is rested in cradle recesses 19, handle brackets 17 are turned outwardly, as in case of the right hand bracket in Fig. 3 so as to lie flat against ledges 24 projecting outwardly from cradle members 18. Thereafter, wing screws 25 threaded in the handle brackets, are screwed downwardly to solidly attach the pump to its mounting structure. This pump mounting means is illustrated and claimed in detail in a copending application Serial No. 537,552, filed May 27, 1944, now Patent Number 2,424,469 issued July 22, 1947, in the name of the present applicant.

Upper opening 11 is provided with detachable closure structure including a separately formed plate 30 having a pair of orifices 31 and 32. A tube fitting 33 is received in orifice 31 and secured in position by machine screws 34. A gasket 35 interposed between the fitting and plate prevents leakage. The fitting is screw threaded in its upper extremity for attachment of a tube or pipe (not shown) leading to the engine. A sealing fitting 36 is threaded into the lower opening of fitting 33 and attaches thereto a flexible fuel conduit 37 which extends to outlet fitting 38 on the pump and serves as the fuel delivery connection.

Fitting 36 is of a known type and comprises an angular wrench receiving central part and an externally threaded portion 39 receiving a nut 40, externally, and the end of conduit 37, internally. A sleeve 41 having a bent-in extremity 42 urged to bite into the conduit by nut 40 seals this part of the fitting. Member 36 also has a reduced tubular portion 43 with a flared extremity which is urged against a shoulder 44 in fitting 33 by a nut 45 received on element 43. A packing 46 prevents leakage between element 43 and nut 45. Fitting 33 also has a by-pass restriction 47 which provides for instantly breaking the siphon in the fuel line as the pump stops, where the carburetor is located at a low level as is frequently the case in buses.

The second orifice 32 in upper plate 30 is closed by a pair of hollow, wire sealing fittings 48 and 49 provided with flanges 50 and 51 respectively, which seat against sealing washers 52 and 53 interposed between plate 30 and the fittings. These fittings, washers, and the plate are sealingly secured together by machine screws, as at 54.

Lower fitting member 49 has upstanding structure 55 which, in the assembly, is nested within upper fitting 48. Structure 55 firmly holds the end of electrical wire 57a and protecting flexible cable 57. A threaded boss 58 forms a terminal for connection of a wire 56 by means of a terminal screw 60. Wire 56 extends through a threaded outlet opening 61 in fitting 48 which receives a pair of washers 62 and 63, the latter being of resilient material, such as synthetic rubber, and being squeezed into sealing fit with the wire and fitting by a nut 64.

A U-sectioned sheet metal ring 66, shaped in general correspondence with the circumference of opening 11 and plate 30 has flanged base portions 67 and 68 which rest against tank wall 10 and are bolted and soldered thereto as at 69 and 70. The central recessed portion of this ring receives at regular intervals a series of nuts 71 spot welded in position so as to form, in effect, integral enlargements on the ring. Interposed between plate 30 and ring 66 is a sealing gasket 72 of suitable yielding material such as cork or synthetic rubber. The plate, gasket, and two rings are detachably but sealingly secured together by cap screws 73 circumferentially arranged at regular intervals and threaded into nuts 71. Thus, the fitting supporting edge of tank plate 10 is reinforced and sealing pressure is applied to ring 66 rather than the less substantial material of the tank wall.

In order to equip a fuel tank for mounting the pump, it is necessary first to cut the openings 11 and 13 therein in vertical alignment. Lower plate structure 21 carrying cradle members 18 is then permanently secured over lower opening 13. The motor is then mounted on the cradle members and the delivery tube and electrical connection are connected to the appropriate fittings previously attached to plate 30. Next, ring 66 is bolted and soldered into position about the upper opening and the upper plate structure is bolted to the ring element. Finally, wire 56 leading to the battery is sealed by nut 64 and the fuel delivery tube is connected to the upwardly exposed threaded opening in fuel delivery fitting 33. The pump is then properly mounted inside the tank and its electrical and fluid conduits connected for operation, respectively, to a source of electrical energy and the engine fuel intake, both outside the tank. If it is desired to inspect or repair the pump, this can be done by removal of the entire upper plate structure by the withdrawing of machine screws 73 whereupon wing screws 25 can be released and the pump unit removed from the tank.

The invention may be modified in various respects as will occur to those skilled in the art and the exclusive use of all modifications as come within the scope of the appended claims is contemplated.

I claim:

1. Fuel tank wall structure providing for sealing attachment and support of a conduit passing through the wall comprising a separately formed plate, accessory connecting and sealing structure mounted on said plate, a strengthening ring shaped in correspondence with an opening in the tank wall to be closed by said plate and of inverted U-section, a sealing washer for interposition between said ring and said plate, bolts detachably securing together said ring, washer, and plate, said ring forming a hollow, raised part for directly receiving said washer and bolts and having flanged legs forming a relatively broad base part for resting against and permanent attachment to the tank wall, and a series of nuts lodged in said hollow part of said ring for securing said bolts.

2. Wall structure for closing an opening in a fuel tank wall provided for receiving a fuel pump and for sealing attachment and support of pump operating connections comprising a separately formed plate, fuel pump connections mounted on said plate, a sheet metal bolting ring shaped in general conformance with the tank wall opening and of U-section with flanged legs, sealing means interposed between said ring and the plate, a series of threaded elements lodged against the inner portion of said ring opposite said sealing means, and bolts detachably securing together said ring, sealing means, and plate and received by said elements, said leg flanges of said ring forming a broad base portion for resting against and permanent attachment to the tank wall about said opening and being relatively rigid laterally for bracing the tank opening.

ALFRED C. KORTE.

REFERENCES CITED

The following references are of record in the file of this patent:

UNITED STATES PATENTS

| Number | Name | Date |
|---|---|---|
| 1,579,672 | Strecker | Apr. 6, 1926 |
| 1,908,092 | Whitted | May 9, 1933 |
| 2,084,605 | Webb | June 22, 1937 |
| 2,306,297 | Curtis | Dec. 22, 1942 |
| 2,352,958 | Lauer et al. | July 4, 1944 |
| 2,369,440 | Curtis | Feb. 13, 1945 |
| 2,370,590 | Taylor | Feb. 27, 1945 |